(12) United States Patent
Kekas et al.

(10) Patent No.: US 6,178,018 B1
(45) Date of Patent: Jan. 23, 2001

(54) PROCESS AND METHOD EMPLOYING DYNAMIC HOLOGRAPHIC DISPLAY MEDIUM

(75) Inventors: Dennis Jason Kekas; Jon Alan Herlocker, both of Tucson, AZ (US); Mitchell Levy Loeb, Durham, NC (US)

(73) Assignee: International Business Machines Corporation, Armonk, NY (US)

( * ) Notice: Under 35 U.S.C. 154(b), the term of this patent shall be extended for 0 days.

(21) Appl. No.: 09/344,595

(22) Filed: Jun. 25, 1999

(51) Int. Cl.$^7$ ........................................... G03H 1/08
(52) U.S. Cl. ............................................ 359/9; 359/3
(58) Field of Search ..................................... 359/3, 9

(56) References Cited

U.S. PATENT DOCUMENTS

| | | |
|---|---|---|
| 5,020,882 | 6/1991 | Makow . |
| 5,122,890 | 6/1992 | Makow . |
| 5,221,989 * | 6/1993 | Stappaerts et al. ............... 359/323 |
| 5,303,043 * | 4/1994 | Glenn ................................. 359/9 |
| 5,440,428 | 8/1995 | Hegg et al. ...................... 359/630 |
| 5,517,278 | 5/1996 | Takahara et al. ................ 354/471 |
| 5,552,840 | 9/1996 | Ishii et al. ....................... 348/751 |
| 5,564,810 | 10/1996 | Larson ............................... 353/8 |
| 5,589,980 | 12/1996 | Bass et al. ....................... 359/478 |
| 5,608,554 | 3/1997 | Do et al. ..................... 349/703 LS |
| 5,798,864 * | 8/1998 | Sekiguchi ............................ 359/9 |

FOREIGN PATENT DOCUMENTS

| | | |
|---|---|---|
| 59-018932 | 1/1984 | (JP) . |
| 60-006922 | 1/1985 | (JP) . |

OTHER PUBLICATIONS

IBM Technical Disclosure Bulletin, vol. 28, No. 6, Nov. 1985 "Frame–Sequential Electronic Color Display Filters".

* cited by examiner

Primary Examiner—Darren Schuberg
(74) Attorney, Agent, or Firm—Paul Kraft; Joscelyn G. Cockburn

(57) ABSTRACT

Conventional display technology can be used to display crude computer generated holograms (CGH), and can be extended to moving displays. However, the ones best suited from the standpoint of illumination flexibility, such as the common Liquid Crystal Displays (LCDs), switch very slowly. Thus systems with far better dynamic—rapid response requires very complex drive electronics. A non-memory ceramic PLZT, dynamic holographic display medium, provides much faster response time relative to common LCD technology. This system, which is the major embodiment of the present invention, also exhibits good spatial display capability. The system of the present invention, can display Fast Fourier Transformation (FFT) Computer Generated Holograms (CHHs); thus allowing the use of FFT based manipulation of images. By using a delta image updating in Fourier space, the instant system will speed up image generation significantly; since it is often the case that an object's spatial frequency components change more slowly than its position.

18 Claims, 4 Drawing Sheets

FRONT VIEW: SLAB OF CERAMIC PLZT WITH TRANSPARENT ITO ELECTRODE OVER PHOTOCONDUCTIVE LAYER.

FRONT VIEW: SLAB OF CERAMIC PLZT WITH TRANSPARENT ITO ELECTRODE OVER PHOTOCONDUCTIVE LAYER.

REAR VIEW: SLAB OF CERAMIC PLZT WITH TRANSPARENT ITO ELECTRODE.

ENLARGED VIEW DEPICTING ALIGNMENT OF INDEX AXIS IN INDIVIDUAL MATERIAL GRAINS IN RESPONSE TO AN APPLIED POLING ELECTRIC FIELD.

PROCESS AND METHOD EMPLOYING DYNAMIC HOLOGRAPHIC DISPLAY MEDIUM

CROSS-REFERENCE TO RELATED PATENT APPLICATION

The following six copending six patent applications are all assigned to a common assignee. These are application Ser. No. 09/344,536, filed Jun. 25, 1999, Titled A SYSTEM AND METHOD INVOLVING A REVERSIBLE HOLOGRAPHIC RECORDING MEDIUM; application Ser. No. 09/344,575, filed Jun. 25, 1999, Title: A SYSTEM AND METHOD EMPLOYING DYNAMIC HOLOGRAPHIC DISPLAY MEDIUM; application Ser. No. 09/337,030, filed Jun. 25, 1999, Titled: METHOD AND SYSTEM FOR PREPARING HOLOGRAPHIC FULL-COLOR DISPLAYS; application Ser. No. 09/344,594, filed Jun. 25, 1999, Titled: METHOD AND SYSTEM FOR USE OF A VIRTUAL REALITY HEADSETS BASED ON PLZT HOLOGRAPHIC DISPLAY; application Ser. No. 09/344,591, filed Jun. 25, 1999, Titled: Titled METHOD AND SYSTEM FOR BACKLIGHTING AND DIFFUSION WITH PLZTS; application Ser. No. 09/340,324, filed Jun. 25, 1999, Titled: SYSTEM and METHOD FOR CONTROLLING AND MONITORING OF OPTICAL WAVEGUIDE SIGNALS USING PLZT DEVICES. All six of the above patent applications are related to patent application Ser. No. 09/182,075, filed on Oct. 29, 1998. This copending application, titled "35 mm SLIDE PROJECTION PANEL FOR USE WITH COMMONLY AVAILABLE PROJECTION DEVICES" and is hereby incorporated by reference into the above referenced six inventions.

TECHNICAL FIELD

Current holographic recording media exhibit several problems. A hologram is a three-dimensional image record created by holography; a method of reproducing light interference patterns on a medium such as photographic film, creating a hologram. The hologram consists of a light interference pattern preserved in a medium such as photographic film. When suitably illuminated, it produces an image that changes its appearance as the viewer changes their viewing angle.

The present invention based on a novel recording material. PLZT serves as the basis of the present application and is a Lanthanum enhanced lead zirconate titanate composition.

BACKGROUND OF THE INVENTION AND RELATED ART

At this point it would be useful, with regard to the present invention, to discuss related art. A search of this art has noted the following patent references. A careful review of these patents, readily distinguishes present invention from any of this earlier art.

U.S. Pat. No. 5,608,554—This reference pertains only to a 2D-Display medium and uses non-coherent light sources. It does not employ Holography or 3D U.S. Pat. No. 5,122,882 This reference pertains to 2D-animated display medium (no 3D or holography involved). In addition it utilizes a white light source and a simulated display.

U.S. Pat. No. 5,122,890 This reference is similar to the above reference U.S. Pat. No. 5,122,882. It represents a 2D-animated display (no 3D or holography involved)and utilizes a white light source and a simulated display.

U.S. Pat. No. 5,517,278 This patent represents a 2D display device for video camera viewfinder and is not used for holography. It uses a non-coherent light source.

U.S. Pat. No. 5,440,428 This reference is totally unrelated to the present invention. It is for an improved automotive (heads-up display, is not a holographic 3D display medium. It represents a mirror system (can utilize a permanent holographic narrow band reflecting mirror) and no PLZTs used.

U.S. Pat. No. 5,589,980 This patent represents a 2D or simulated 3D display (not holographic). It uses layered images in a projection system to simulate 3D and is completely different from the present application.

U.S. Pat. No. 5,552,840 This reference utilizes stereoscopic vision to simulate a 3D image (uses parallax). No holography used and it uses S and P polarized light to provide stereoscopic images and eyeglasses that separate the light for left and right eye viewing. It is completely different from the present invention.

IBM Technical Disclosure Bulletin vol28 no.6 November 1985 Uses PLZTs for color filters and not a holographic display medium. This is not a display system.

Japanese Patent No.JP60006922A This patent employs Optical control element to make high-speed optical shutters and has nothing to do with a holographic display.

Japanese Patent No. JP59018932A Represents an Optical deflecting device and has nothing to with holographic displays.

As noted in the above referenced copending patent application, Ser. No. 09/182,075, filed on Oct. 29, 1998, describes a PLZT inorganic material. This PLZT material serves as the basis of the present application and is a Lanthanum enhanced lead zirconate titanate material. It is piezoelectric/optic ceramic material. It would now be helpful to the understanding of the present invention to describe the composition and nature of this PLZT ceramic material.

PLZT can be prepared in the following two ways. In one case a mixed oxide(MO) and in the other case chemically prepared (CP). The applicant used, the mixed oxide process to prepare the PLZTs. The mixed oxide (MO) is prepared by wet mixing the oxide powers of Lead (PbO). lanthanum (La2O3), Zirconium (ZrO2) and Titanium (TiO2). The mixture is then dried, calcined (a high temperature solid state chemical reaction), then milled to reduce the particle size to a desired level. A slug is then created by cold pressing, and then a wafer can be formed from the slug by hot pressing. The wafer thus produced is then sliced and polished for use as the panels for the liquid display. The wafer can be up to 15 cm in diameter and from 0.5 mm up to several millimeters in thickness after polishing. It consists of a uniform microstructure of controlled grain size of approximately 2 to 15 um. The grain size is important, as it places a lower limit on how close the controlling electric fields can be and thus limits the pixel size.

While Lanthanum Oxide is preferred, it should be noted that this invention is not necessarily limited to Lanthanum Oxide. Rather Lanthanum Oxide can be replace with other oxides in the PERIODIC TABLE of ELEMENTS, within the "LANTHANIDE Series". This includes Cerium Ce, Praseodymium Pr, Neodymium Nd, Promethium Pm, Samarium Sm, Europium Eu, Gadolinium Gd, Terbium Tb, Dysprosium Dy, Holmium Ho, thulium tm, Ytterbium Yb, Lutetium Lu.

SUMMARY OF INVENTION

Conventional display technology can be used to display crude computer generated holograms (CGH), and can be extended to moving displays. However, the ones best suited from the standpoint of illumination flexibility, such as the common Liquid Crystal Displays (LCDs), switch very slowly. Thus systems with far better dynamic—rapid response requires very complex drive electronics.

A non-memory PLZT, dynamic holographic display medium, provides much faster response time relative to common LCD technology. This system, which is the major embodiment of the present invention, also exhibits good spatial display capability. The system of the present invention, can display Fast Fourier Transformation (FFT) Computer Generated Holograms (CHHs); thus allowing the use of FFT based manipulation of images.

By using a delta image updating in Fourier space, the instant system will speed up image generation significantly; since it is often the case that an object's spatial frequency components change more slowly than its position. In addition, apparent changes in size due to perspective can be handled using 3-Dimensional Fourier manipulation so that the display generation of true-size invariant objects is complete in the Fourier domain.

DETAILED DESCRIPTION OF THE PREFERRED EMBODIMENT

It would be beneficial, at this point, to first define certain terms, which would be useful and used in the discussion of the details of this invention.

Glossary of terms

PLZT: is a Lanthanum enhanced lead zirconate titanate material. It is piezo-electric/optic ceramic material. It would now be helpful to the understanding of the present invention to describe the composition and nature of this PLZT ceramic material.

LCD: A liquid Crystal Display (LCD) is a type of display that uses a compound having polar molecular structure, sandwiched between two transparent electrodes. When an electric field is applied, the molecules align within the field, forming a crystalline arrangement that polarizes the light passing through it. A polarized filter laminated over the electrodes blocks polarized light. In this way, a grid of electrodes can selectively "turn on" a cell or a pixel, containing the liquid crystal material, turning it dark. If desired, some types of liquid crystal displays, employ an electro-luminescent panel placed behind the screen to illuminate it. This is commonly referred to as a "backlight" screen. It is used to improve readability but represents a disadvantage since it represents a cost of drawing more power.

Delta Image represents notion display compression or band width limiting, based upon processing only differences between successive frames.

Phase Mode: This represents the use of an electro-optic material in a mode in which the index variation leads to a variation in the phase of the optical wave going through the material.

Scattering Mode: This represents the use of an electro-optical material in a mode in which scattering is induced at material grain boundaries due to abrupt changes in refractive index at the grain boundaries. Scattering means a directed ray's energy is redistributed through a different path or space than before the event.

Figure 1:
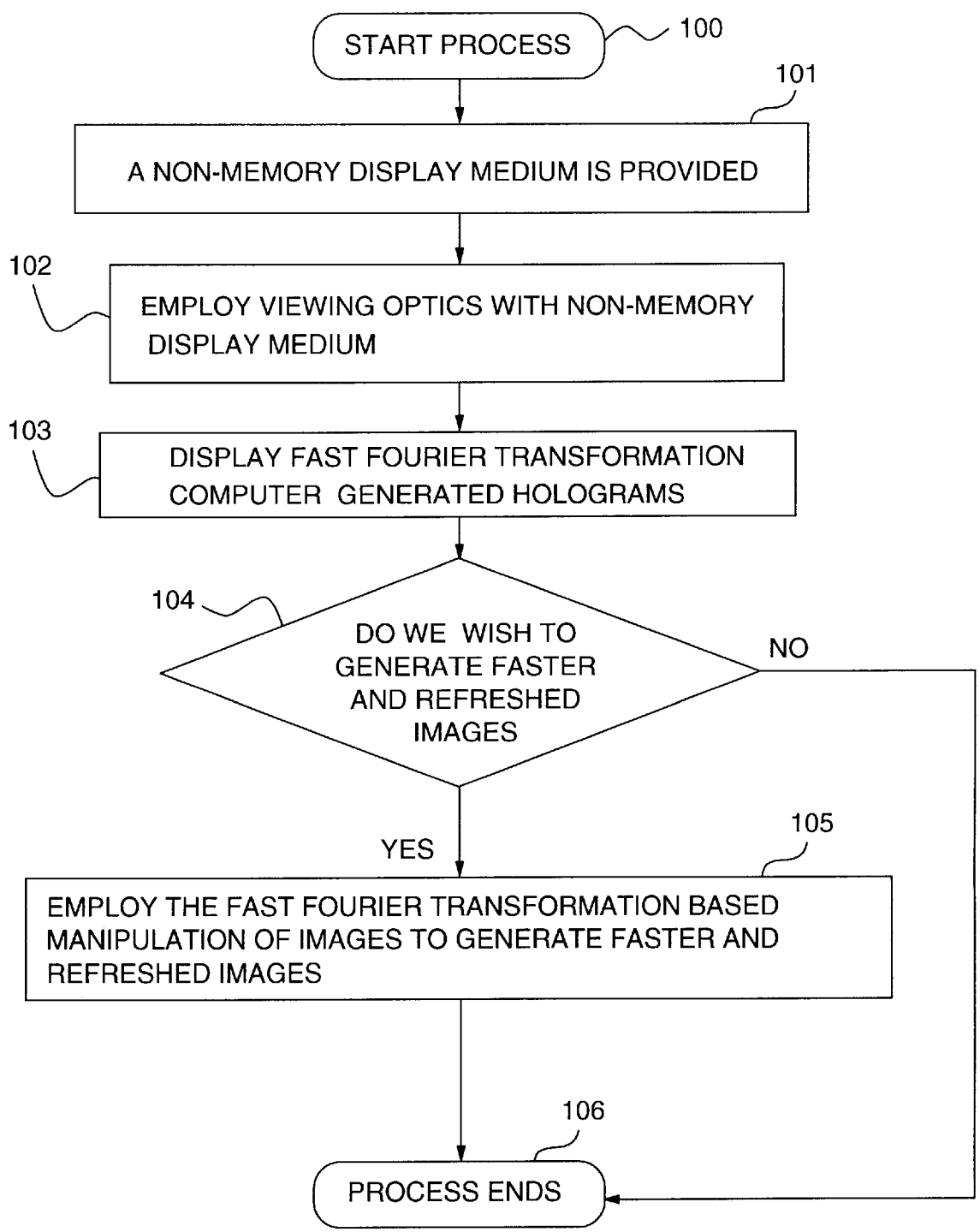
FIG. 1 This flow chart represents a general perspective of the method used to employ PLZTs as a dynamic holographic medium.

As noted earlier, FIG. 1 flow chart represents a general perspective of the method used to employ the PLZT a dynamic holographic display medium. It can be seen that the process is initiated at 100 to employ the PLZT as a dynamic holographic display medium at 101. The process is continued by employing viewing optics with non-memory display medium at 102. This is followed by displaying FFT computer generated holograms at 103.

The query is then raised at 103 as to whether the user wishes to generate faster and refreshed images at 204. If the answer to 104 is no, then the process is complected and the process ends at 106.

If the answer to 104 is yes, then the process moves on to 105, where the process employs the FFT based manipulation of images to generate faster and refreshed images. Then the process is complected and the process ends at 106

Figure 2:
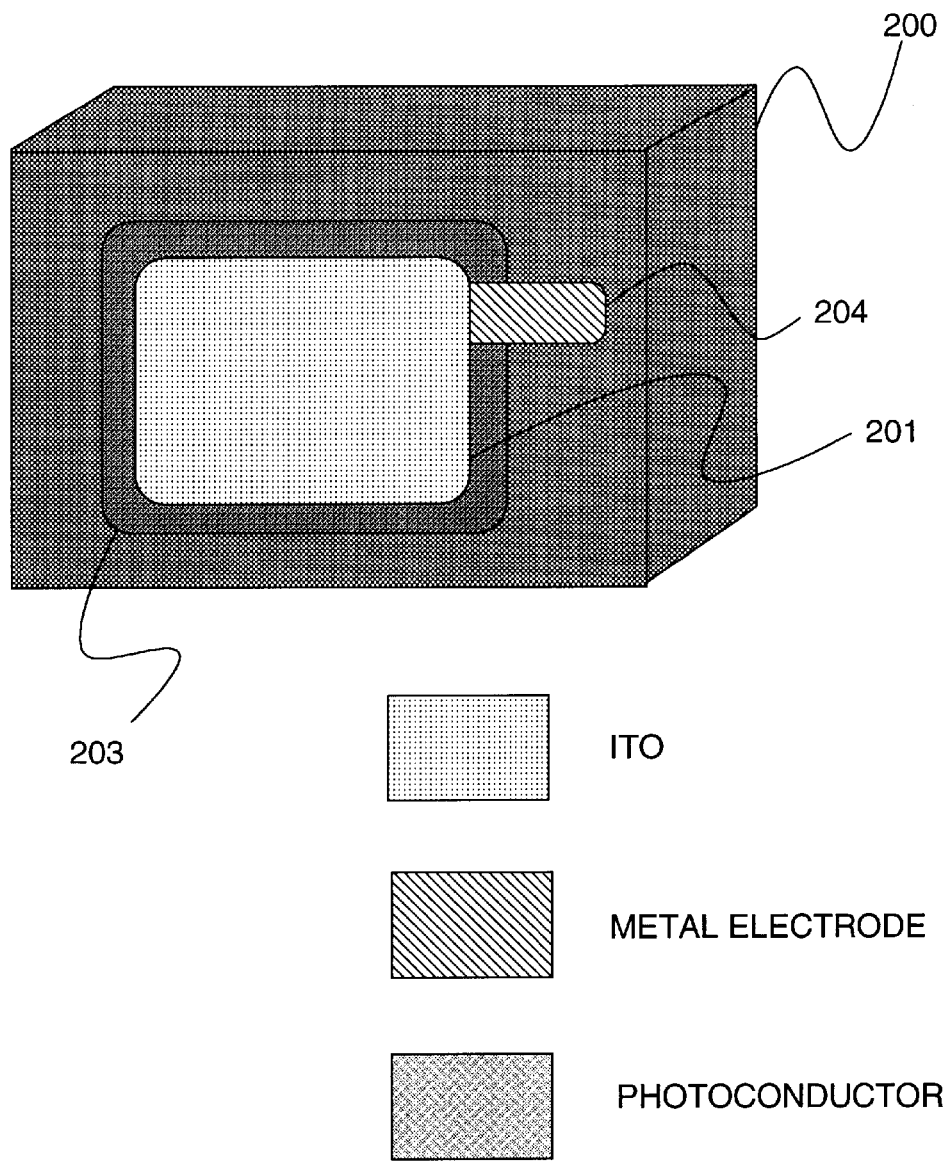
FIG. 2 This is a representation of the "front view" of a slab of ceramic PLZT.
Figure 3:
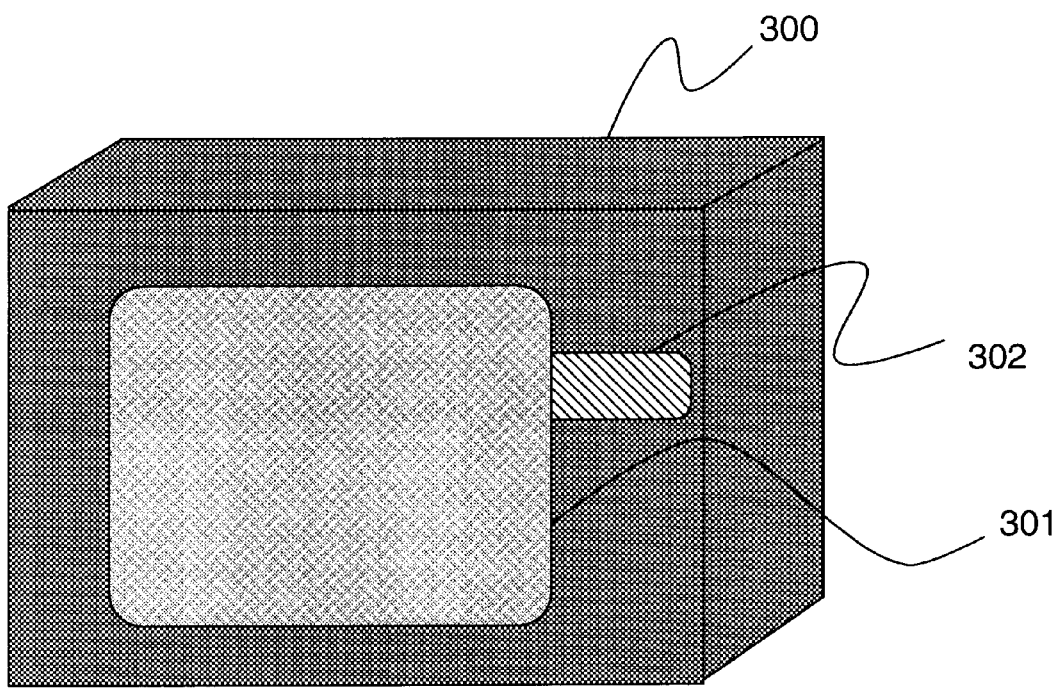
FIG. 3 This is ea representation of the "rear view" of a slab of ceramic PLZT.
Figure 4:
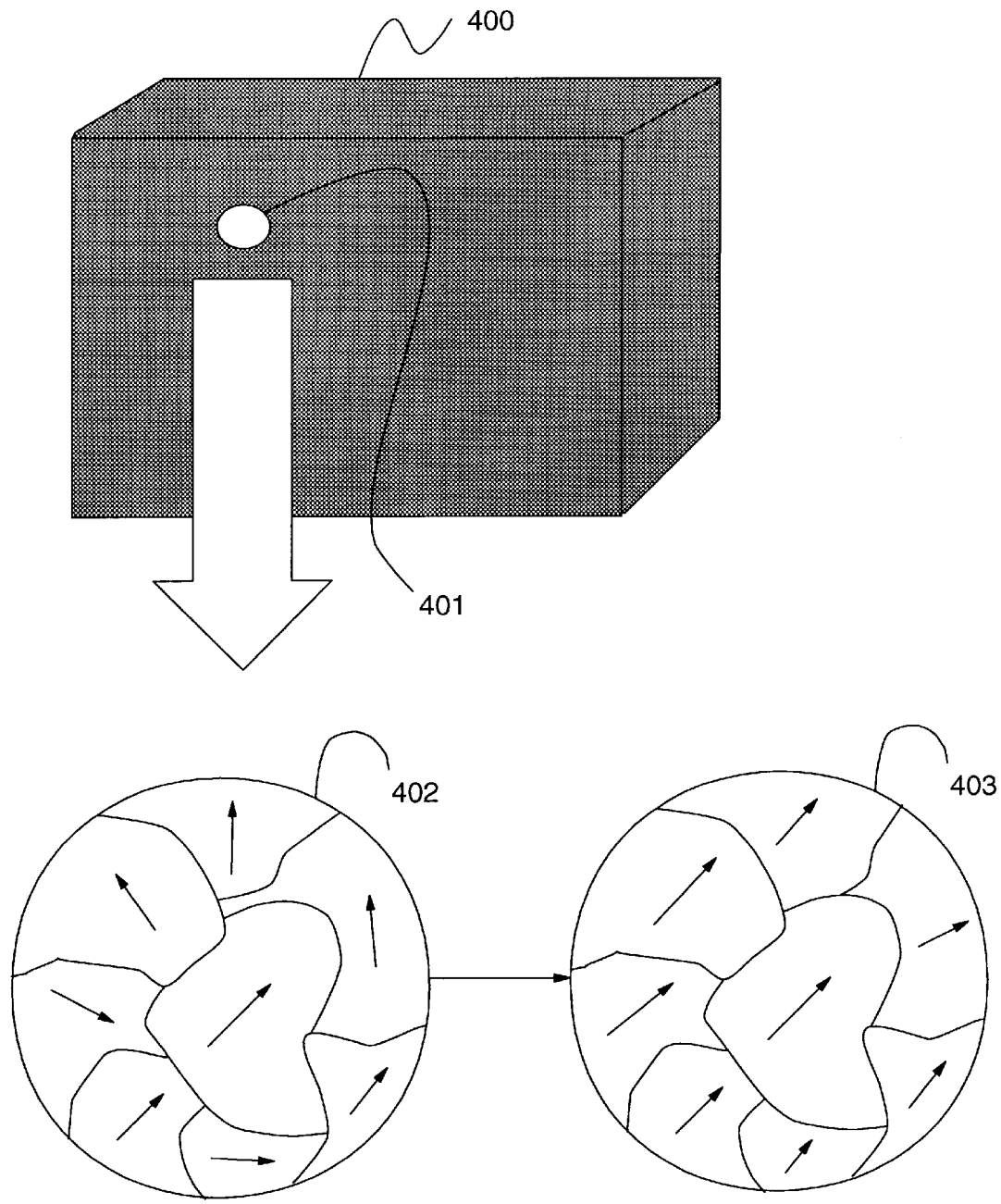
FIG. 4 This represents a enlarged view, depicting alignment of index axis in individual material grains in response to an applied poling electric field.

As noted above, FIG. 2 represents the "front view" of a slab of ceramic PLZT at 200, with transparent indium-tin-oxide (ITO) electrode at 201, over photoconductive layer at 203. Another electrode 204 is also shown. FIG. 3 is a representation of the "rear view" of a slab at 300, with transparent ITO electrode at 301 and another electrode 302. FIG. 4 shows the slab ceramic material at 400 represents an enlarged view from 401 to the enlarged view at 402, depicting alignment of index axis at 403 in individual material grains in response to an applied poling electric field.

The "non-memory" PLZT material employed in the instant invention, is a specific material phase in the lanthanum-enhanced lead-zerconate-titinate ceramic system. The material may be commercially prepared; it is produced by hot-pressing a mixture of powdered components in the proper ratios.

A major distinguishing feature of these materials, in addition to the relatively rapid writing response, is the scattering-mode effect observed in them. This is a writing mode in which refractive index discontinuities at grain boundaries, resulting in scattering. This leads to an apparent dark area in the material. Using transparent photoconductive coating on the surface of a plate of the PLZT material, covered with a transparent indium-tin-oxide (ITO) electrode, a poling field can be selectively applied to sections illuminated by light. A holographic interference pattern is thus created in the device when an appropriate bias is applied to the sample via the aforementioned light-controllable electrode and a simple ITO backside ground electrode. The light-amplitude pattern is controlled by the presence of this field. i.e. it is erased by relaxation of the applied field. In this arrangement, the axis of the writing system may be normal to the surface of the plate, though tilted geometries may also be employed.

Since these materials exhibit electro-optic (EO) properties, they may also be used to record phase patterns. To accomplish this, a bias must be selectively applied transverse to the optical axis in the area where a phase shift is desired.

What is claimed is:

1. A computer based dynamic holographic display system and medium, comprising:

a non-memory display material means based on PLTZ coated with a transparent photoconductive coating and covered with a transparent indium-tin-oxide electrode;

means for employing viewing optics with said non-memory holographic material, to display Fast Fourier Transformation computer generated holograms;

means of employing said Fast Fourier Transformation based manipulation of images to generate faster and refreshed said images, than attainable by Liquid Crystal Display Material.

2. The system of claim 1 wherein said PLTZ based system functions more rapidly than the comparable common Liquid Crystal Display material, for said display purpose.

3. The system of claim 1 wherein said PLTZ based system exhibits spatial display capabilities which are equal to or better than the comparable common Liquid Crystal Display material.

4. The system of claim 1 wherein said PLTZ based system displays Fast Fourier Transformation (FFT) Computer Generated Holograms (CHHs).

5. The system of claim 4 wherein said PLTZ based system displays facilitates the use of Fast Fourier Transformation based manipulation of images.

6. The system of claim 5 wherein said PLTZ based system wherein the use of a delta image updating in Fourier space, speeds up image generation.

7. The system of claim 1 wherein said PLZT holographic medium is derived from a mixture of metal oxides comprising lead, lanthanum, zirconium and titanium.

8. The system of claim 7 wherein said metal oxides are lead oxide (Pbo), lanthanum oxide (La2O3), Titanium Oxide (TiO2) and Zirconium Oxide (ZrO2).

9. The system of claim 8 wherein the Lanthanum Oxide can be replace with any other oxide in the periodic table of elements from the "Lanthanide Series", which includes Cerium Ce, Praseodymium Pr, Neodymium Nd, Promethium Pm, Samarium Sm, Europium Eu, Gadolinium Gd, Terbium Tb, Dysprosium Dy, Holmium Ho, thulium tm, Ytterbium Yb, Lutetium Lu.

10. A computer based method for employing a dynamic holographic display medium, comprising the steps of:

providing a non-memory display medium based on PLZT, coated with a transparent photoconductive coating and covered with a transparent indium-tin-oxide electrode;

employing viewing optics with said non-memory material, to display Fast Fourier Transformation computer generated holograms;

employing said Fast Fourier Transformation based manipulation of images to generate faster and refreshed said images, than attainable by Liquid Crystal Display Material.

11. The method of claim 10 further comprising the steps of:

using said PLTZ based method to attain more rapid displays than the comparable common Liquid Crystal Display material can provide for display purpose.

12. The method of claim 10 further comprising the steps of:

employing said PLTZ based method to attain spatial display capabilities which are equal to or better than the comparable common Liquid Crystal Display material.

13. The method of claim 10, further comprising the steps of:

employing said PLTZ based method for displaying said Fast Fourier Transformation (FFT) Computer Generated Holograms (CHHs).

14. The method of claim 13 further comprising the steps of:

wherein said PLTZ based method to facilitate the use of said Fast Fourier Transformation based image manipulation.

15. The method of claim 10 further comprising the steps of:

using said PLTZ based method of a delta image updating in Fourier space, to speed up image generation.

16. The method of claim 10 further comprising the steps of:

employing said PLZT non-memory material, which is derived from a mixture of metal oxides comprising lead, lanthanum, zirconium and titanium.

17. The method of claim 16 wherein said metal oxides are lead oxide (Pbo), lanthanum oxide (La2O3), Titanium Oxide (TiO2) and Zirconium Oxide (ZrO2).

18. The method of claim 17 wherein the Lanthanum Oxide can be replace with any other oxide in the periodic table of elements from the "Lanthanide Series", which includes Cerium Ce, Praseodymium Pr, Neodymium Nd, Promethium Pm, Samarium Sm, Europium Eu, Gadolinium Gd, Terbium Tb, Dysprosium Dy, Holmium Ho, thulium tm, Ytterbium Yb, Lutetium Lu.

* * * * *